United States Patent [19]

Lojek et al.

[11] Patent Number: 4,676,196

[45] Date of Patent: Jun. 30, 1987

[54] ABSORBENT MATERIAL

[75] Inventors: John S. Lojek; Donald B. Martin, both of Elmira, Canada

[73] Assignee: Martin Feed Mills Ltd., Elmira, Canada

[21] Appl. No.: 747,031

[22] Filed: Jun. 20, 1985

Related U.S. Application Data

[63] Continuation-in-part of Ser. No. 643,012, Aug. 22, 1984, abandoned.

[30] Foreign Application Priority Data

Jun. 20, 1984 [CA] Canada .................................... 457055

[51] Int. Cl.[4] ............................................ A01K 1/015
[52] U.S. Cl. ........................................................ 119/1
[58] Field of Search ................................................ 119/1

[56] References Cited

U.S. PATENT DOCUMENTS

| | | | |
|---|---|---|---|
| 1,967,333 | 7/1934 | Smith | 119/1 |
| 2,014,900 | 9/1935 | Lapp | 119/1 |
| 2,376,672 | 5/1945 | Dreyling | 119/1 |
| 2,597,457 | 5/1952 | Cook | 119/1 |
| 2,671,427 | 3/1954 | Fell | 119/1 |
| 3,059,615 | 10/1962 | Kuceski et al. | 119/1 |
| 3,286,691 | 11/1966 | McFadden | 119/1 |
| 3,425,397 | 2/1969 | Schulein et al. | 119/1 |
| 3,789,797 | 2/1974 | Brewer | 119/1 |
| 3,921,581 | 11/1975 | Brewer | 119/1 |
| 3,923,005 | 12/1975 | Fry et al. | 119/1 |
| 3,983,842 | 10/1976 | Marion et al. | 119/1 |
| 4,157,696 | 6/1979 | Carlberg | 119/1 |
| 4,163,674 | 8/1979 | Been | 119/1 X |
| 4,258,660 | 3/1981 | Pris et al. | 119/1 |
| 4,263,873 | 4/1981 | Christianson | 119/1 |
| 4,275,684 | 6/1981 | Kramer et al. | 119/1 |
| 4,296,709 | 10/1981 | Schulein, Jr. | 119/1 |
| 4,311,115 | 1/1982 | Litzinger | 119/1 |
| 4,315,761 | 2/1982 | Larrson et al. | 119/1 X |
| 4,355,593 | 10/1982 | Stapley | 119/1 |
| 4,405,354 | 9/1983 | Thomas, II et al. | 119/1 X |
| 4,409,925 | 10/1983 | Brundrett et al. | 119/1 |
| 4,458,629 | 7/1984 | Gerber | 119/1 |

FOREIGN PATENT DOCUMENTS

| | | | |
|---|---|---|---|
| 0085939 | 8/1983 | European Pat. Off. | 119/1 |
| 2902101 | 8/1980 | Fed. Rep. of Germany | 119/1 |

Primary Examiner—Robert P. Swiatek
Attorney, Agent, or Firm—Roylance, Abrams, Berdo & Goodman

[57] ABSTRACT

A dried agglomerated biodegradable absorbent material for household and industrial use is disclosed, made from ingredients comprising (a) a solid odor control material which is basic, neutral or acidic, (b) a member of the group of dried alfalfa or other chlorophyll containing grasses, baking soda, finely divided paper, wood flour, sawdust, peat moss, cotton seed hulls, tomato pumice and mixtures thereof, the baking soda not being present in conjunction with an acidic odor control material, the peat moss, cotton seed hulls or tomato pumice only being present with an acidic or neutral odor control material; (c) a member of the group of Portland cement and plaster of Paris; (d) a binder of the group of starches, gum, glues and mixtures thereof; and (e) a density control agent; the ingredients being in amounts selected to provide required density, strength and water absorbent properties to the material. Most preferably the material also includes a member of the group of sand, soil, ground rock, flyash and mixtures thereof as density control agent. A method of preparation is also disclosed.

19 Claims, No Drawings

ABSORBENT MATERIAL

CROSS REFERENCE TO RELATED APPLICATION

This application is a continuation-in-part of application Ser. No. 643,012, filed Aug. 22, 1984, and now abandoned.

BACKGROUND OF THE INVENTION

This invention relates to an improved absorbent material and a process for making it. More particularly it relates to an animal litter which is composed of a particular combination of ingredients and is made by an agglomeration process.

Most such absorbent materials in the prior art are made by mere mixing of ingredients, the use of a pellet mill or an extrusion process, or the material is used per se. As is well known, the use of a pellet mill requires pressure for compaction and is a "dry" process wherein the amount of moisture cannot be more than about 17 or 18%. An extrusion process is a so-called "wet" process wherein about 30 to 50% moisture can be included with the ingredients and, following extrusion, the material is cut into pellets and dried.

The first animal litter absorbent products which achieved commercial success were based on the use of particular types of moisture-absorbent clay, that is diatomaceous earths. These materials were primarily constituted solely of various such clays and so were relatively heavy and increased shipping and handling costs were involved. Furthermore, such clays being of a special nature are found only in a few areas and have to be shipped long distances. Dust is also a problem with the clay-based animal litters, which dust can cause allergies in people and animals. Furthermore such materials do not absorb or neutralize odours.

Other animal litters which have been suggested for livestock and poultry, and in some cases for animals such as cats and dogs, rabbits and the like, are peat moss, a waste material from sugar plantations known as bagasse, treated cotton seed hulls, acidified cellulosic material, ground peanut hulls which may be pelletized, ground paper, finely divided calcium hydrosilicate, sand and the like as the main ingredients. However, none of these materials have been used or suggested for use in any agglomeration process. Sand is heavy and cannot be granulated by itself. Of the other materials, even when they are pelletized they tend to disintegrate in the presence of liquid animal waste. Even though they may have satisfactory adsorptive capacity they are dusty and too light to serve as satisfacory animal litters, particularly for cats, as they are too easily scattered about. Furthermore, some of these materials are regional products and even seasonal, leading to an unsure source of supply. None provide an all-purpose product and are generally impractical for use as a cat litter.

Still other animal litters which have been developed are generally made by the use of a pellet mill or an extrusion process and are based on the use of materials such as fibrous materials, as for example alfalfa, and also materials such as vermiculite, and other lightweight materials. However these litters are also of low density which, despite the claims for such products, is not an advantage in that they tend to adhere to the animal and get tracked around the house or surroundings. Also cats, for example, like to scratch and cover their excrement and with such light materials scattering occurs. In fact, this is one of the main reasons why these materials have not replaced the clay based products on the market.

Alfalfa and other grasses have been considered for animal litters particularly because of the presence of chlorophyll therein which provides odour control. However such products are more expensive than clay products and possess other disadvantages. These pelletized or formed products are often soluble to some extent in liquid animal wastes, and decompose and/or clump after use as the pellets disintegrate on the absorbtion of moisture. This nullifies the effectiveness of the product. Odour control is, furthermore, not always satisfactory and sometimes the composition itself has an unpleasant odour.

An agglomeration process has been suggested in the art for the manufacture of an animal litter. U.S. Pat. No. 3,789,797 of Brewer relates to a method of preparing an animal litter for household use. The process relates to the mixing of ground and screened alfalfa with bentonite and then tumbling the particles in an agglomeration process and drying the non-compacted pellets. A moistened binder is added to the powder, the binder being for example molasses, wood molasses, modified starches or a non-toxic glue. The liquid material is disclosed as being added to the agglomerator by pouring. Because of this the product would be fairly soft, light and of large pellets which would have to be ground to smaller particles to serve as a cat litter. Furthermore, despite the allegations in this patent, it would appear from the materials and the proportions used that the litter would be light in weight and would in fact be tracked away from the litter area by the animal. Also this litter would be subject to microbial degradation, and when the binder is water-soluble, the litter would be subject to ever further degradation on contact with moisture.

BRIEF DESCRIPTION OF THE INVENTION

The animal litter product according to the present invention, by contrast, has many advantages over the prior products mentioned. It is less expensive than clay and much less expensive than extruded products. The density and the water absorption of the product can be modified as required for particular applications merely by adjusting the amounts of the ingredients and it has water absorption capacity similar to the clay based litters but a higher rate of absorption. It is dustless and odour control is achieved by absorption and neutralization of liquids. It is also a good dessicant. Unlike the extruded and pelletized products, the present product does not swell and break up on absorbing moisture. Even when alfalfa is included as one of the ingredients there is no strong alfalfa odour. It is biodegradable, can be manufactured anywhere close to consumers, absorbs oil as well as water and the size of the agglomerates can be adjusted at will by changing the parameters of the process. Furthermore it has uses other than as an animal litter as it could, for example, be used as a soil conditioner or as an absorbent for oil.

Thus the present invention provides a dried agglomerated biodegradable absorbent material for household and industrial use, made from ingredients comprising:

(a) a solid non-fibrous odour control material which is basic, neutral or acidic;

(b) a member of the group of dried alfalfa or other chlorophyll containing grasses, baking soda, finely divided paper, wood flour, sawdust, peat moss, cotton seed hulls, tomato pumice and mixtures thereof, said baking soda not being present in conjunction with an acidic odour control material; said peat moss, cotton seed hulls or tomato pumice being present only in conjunction with an acidic or neutral odour control material;

(c) a member of the group of Portland cement and plaster of Paris;

(d) a binder of the group of starches, gum, glues, and mixtures thereof; and (e) a density control agent; the ingredients being in amounts selected to provide required density, strength and water absorbent properties to said material.

Most preferably a number of the group of sand, soil, ground rock, flyash and mixtures thereof is also included as a density control agent.

The present invention also provides a method of making an agglomerated absorbent material as aforementioned which comprises (i) mixing as dry ingredients to form a premix (a) solid non-fibrous odour control material which is basic, neutral or acidic (b) a member of the group of ground dried alfalfa or other chlorophyll-containing grasses, baking soda, finely divided paper, wood flour, sawdust, peat moss, cotton seed hulls, or tomato pumice and mixtures thereof; said baking soda not being present in conjunction with a solid acidic odour control material, said peat moss, cotton seed hulls or tomato pumice being present only in conunction with an acidic or neutral odour control material and (c) a member of the group of Portland cement and plaster of Paris and, optionally, (d) a member of the group of sand, soil ground rock, flyash and mixtures thereof, as density control agent, (ii) adding said premixture to a disc agglomerator and tumbling the particles on said disc agglomerator, (iii) adding a moistened binder of the group of starches, gums and glues to said premix of dry materials on said agglomerator as a pressurized spray, (iv) continuing tumbling of said materials to agglomerate them in a non-compacted state to a required discrete particle size, and (v) drying said agglomerates.

DETAILED DESCRIPTION OF THE INVENTION

The main component preferably utilized in the agglomerated absorbent product according to the present invention as a density control agent is sand or alternatively soil, ground rock or flyash or mixtures thereof. These materials are readily available in all locations and at least one preferably forms the major component of the product. The product thus can be manufactured wherever desired. Of the aforementioned materials, sand is most preferred and the amount of such material can be adjusted so that product density approximates that of the known clay based materials or it can be somewhat less. In any event higher density products prevent animals from spreading the product out of the litter container. Suitable proportions of this component in the final product are about 50 to 90% by weight, preferably 60 to 80% by weight.

The non-fibrous odour control material utilized in the product is a solid material which may be basic, neutral or acid. As the first, limestone is eminently suitable as it neutralizes acids found in animal urine and inhibits the growth of micro-organisms. As a material which may be neutral or acid depending on pH of the environment, gypsum may be used. The limestone or gypsum may also constitute the density control agent, in which case it is suitably present in an amount of about 50–90% by weight of the composition. However, this provides a costlier product than when sand or other of the aforementioned density control agents is included. When such materials as sand are included than suitable proportions of limestone or gypsum in the final product are about 5 to 30% by weight, preferably 10–20% by weight.

Cement or plaster of Paris is generally utilized in the composition as binder, the cement or plaster of Paris providing setting properties and hardness to the agglomerated material so that the product has good durability. If the cement or plaster of Paris is not included in the composition, the agglomerates will disintegrate on use. Suitable amounts of cement or plaster of Paris in the final product are 0.1 to 10%, preferably 1 to 5% by weight.

Another component required in the composition of the agglomerates is a member of the group of paper, dried alfalfa or other grasses, baking soda, sawdust, wood flour, peat moss and the like. If a cheaper composition is required then paper is eminently suitable but it must be ground below about 2 millimeters particle size since larger particles show up as flakes in the finished product which detracts from the appearance. The paper serves to reduce the bulk density of the overall product and it can be replaced by sawdust, wood flour or the like but these substitutes are more expensive. If it also desired to enhance odour control, then alfalfa can be used for this component or as at least a part of it. However alfalfa is expensive. An alternative to the use of alfalfa is baking soda but this is not to be used when an acidic odour control material is present. Baking soda does not have the customer appeal of the materials containing chlorophyll such as alfalfa and other grasses. The use of peat moss or alternatives cotton seed hulls or tomato pumice with e.g. gypsum enhances odour control. Tomato pumice is the dried by-product of the production of tomato juice from whole tomatoes. Of these, peat moss is preferred. Inclusion of a component of this group of materials generally decreases the density of the agglomerates and improves the absorption of water, with the odour control function of alfalfa being incidental. Inclusion of peat moss only however does not tend to give as great a reduction in density but does improve water absorption and enhances odour control. If paper is to be included in the composition it is preferably present in an amount of 1 to 30% by weight, preferably 10 to 15% by weight. If dried alfalfa or other grass is to be included, it is suitably present in an amount of 1 to 30% by weight, preferably 10 to 20% by weight. The alfalfa or other grass, when included, must be finely ground or it will not agglomerate properly.

When peat moss, cotton seed hulls or tomato pumice, is included in the composition, suitable proportions are about 1 to 30% by weight, preferably 10–20% by weight of total composition. If dried alfalfa or other grasses, paper or the like are also included, which is preferred, generally the amount of peat moss will be lowered accordingly so that the total will not exceed about 30% by weight of composition.

The binder component of the group of starches as for example corn or potato starch, gums as for example guar gum and glues is required for high viscosity and gelling action or agglomeration will not take place. If starch is included, the proportion used must be within the range of about 1%–3% by weight of total composition for agglomeration to proceed satisfactorily. If a gum such as guar gum is used the proportions may be about 0.5–3% by weight of composition and when glue is used the proportion may vary from about 2% up to about 10% by weight of total composition. However, glues are much more expensive and the preferred choice is starch. Modified starches are more expensive and cannot be used as they do cause an increase in viscosity but do not gel. Gelling action is required in the preparation of the products according to the present invention for agglomeration to occur.

The starch, gum or glue is added to the dry components in the agglomeration process as an aqueous solution or suspension. Suitable concentrations in the solution are about 3 to about 10% by weight starch in water, about 1.5—about 7.5% by weight guar gum in water, or about 3—about 15% by weight glue in water. If concentrations below the aforementioned lower limits are used, the solutions are not sticky enough to serve for the purposes of agglomeration. If sand is included in the composition moisture will also be added by this means and the same is true of peat moss which contains about 30–40% by weight of water. With these ingredients some adjustment of the amount of aqueous solution of binder may be necessary.

In the agglomeration process to be described only about 30 to 35% moisture by weight of dry components is required but about 30 to about 50% is suitable economically, but other proportions may be used.

It is preferred that the aqueous solution of binder added to the agglomeration process to form the compositions of the present invention also include a surfactant or wetting agent. Such materials make spraying of the binder solution easier as without it, viscosity can be a problem. They also improve the rate of absorption of moisture by the final agglomerated particles. Such surfactants as sodium dioctyl sulfosuccinate and polyoxyethylene sorbitan esters are suitable but other surfactants can be used as well and there is no particular limitation as to the type of surfactant which can be used. The surfactants are preferably used in an amount of 0.01 to 0.5% by weight of total product although this amount could be increased up to about 3% by weight. Of course, the surfactant need not be included but if it is, the product has improved properties of water absorption.

A preferred composition according to the present invention comprises 70% by weight of sand, 5% by weight of alfalfa and 10% by weight finely divided paper, 10% limestone, 3% Portland cement, 2% starch and 0.01% of sodium dioctyl sulfosuccinate.

Another preferred composition is 70% by weight sand, 5% by weight peat moss and 10% by weight finely divided paper, 10% gypsum, 3% Portland cement, 2% starch and 0.01% sodium dioctyl sulfosuccinate.

The product according to the present invention is made by a true agglomeration process. This process requires no application of pressure or increased temperature although the use of a binder is necessary. The type of equipment used in an agglomeration process is referred to as a "disc agglomerator" which is well-known and utilizes a disc rotated about an inclined axis. During rotation of the disc the upper surface receives the material to be agglomerated and the rotation produces a tumbling action. Water and other liquid ingredients are deposited thereon and the increasing gravity of the material overcomes the centrifugal force. The particles of the material gradually are enlarged or "snowball" into agglomerates of the desired size.

A dry mixture of, for example, sand, alfalfa, paper, cement and limestone is transferred to the agglomerator disc where the dry mix is preferably fed at the 3 o'clock position to prevent the paper and alfalfa or other light material from flying away from the disc. The speed of rotation of the disc can be adjusted as required but for preparation of granules of suitable size for a cat litter it has been found that a disc speed of about 18–22 rpm is satisfactory, most preferably 20 rpm. Th aqueous solution or dispersion of binder made of starches, gum or glue, preferably mixed with a wetting agent, is sprayed onto the dry mix at several locations. To produce small agglomerates which are preferred for cat litter, the spray must be kept very fine, that is a "mist" of less than 0.1 mm diameter. The use of a wetting agent lowers the surface tension of the binder solution and produces a finer spray pattern which results in smaller granules. The spray must be delivered at a pressure of about 50 to 350 p.s.i. If the spray is too coarse, the granules that are produced are too large and must be reground. However, for other products the spray can be adjusted as to pressure and fineness to provide the desired size of granules. For a cat litter, the size of the granules should not be above about 5 millimeters diameter and an overall range of 1 to 5 millimeters diameter is suitable.

As mentioned before, only about 30 to 35% moisture is required for the agglomeration but the addition of about 30 to 50% is suitable economically Following the agglomeration process, the pellets are dried which is a rapid process in that the granules contain less moisture than for other product litters. The drying is suitably carried out at a temperature of 80° to 300° C. for about 15–30 minutes to reduce the moisture content to about 10% or less. The pellets so produced are durable and do not disintegrate on contact with moisture nor do they swell and break up.

If a wetting agent is not used in the formulation for the absorbent material, and particularly if starch is used as one component of the binder in an amount of about 2–3% by weight of total composition, it has been found that to achieve high water absorption capacity of the product, drying must be carried out within 3–5 hours of agglomeration, otherwise the material becomes hydrophobic and floats on water. This type of product however is useful for oil absorption.

A suitable density for the granules according to the present invention for use as a cat litter is approximately 20 to 30 grams per 50 mls. which is similar to the clay based products, but this can be adjusted to provide a lighter product if desired by the inclusion of more ingredients such as paper and alfalfa and the like.

The following examples are illustrative of the invention but are not to be taken as limiting thereof.

EXAMPLE 1

Old newpaper was ground in a hammer mill to produce particles of 1 mm or less in diameter. 150 kg of the ground newspaper, 700 kg of screened sand, 100 kg of ground limestone and 30 kg of cement were added to a mixer and blended for 10 minutes to produce a fluffy mix. 15 kg of starch was mixed with 300 kg of cold water and heated to 80° C. to produce gelatinized starch. 100 g of sodium dioctylsulfosuccinate was then added to the liquid. The dry mix was then fed by an auger to the rotating disc (rotating at 20 rpm) of a disc agglomerator at the 3 o'clock position. The liquid solution of starch and surfactant was sprayed onto the disc at several spots on the lower right hand side of the agglomerator, the spray being atomized to below 0.1 mm at 60 psi. The product was in the form of pellets of 1-5 mm diameter in size. The product was then fed to a Waldor (trade mark) dryer operating at 80°-90° C. and dried for a period of 15-20 minutes to lower the moisture content to 10% or less. The finished product was then screened to remove fines and oversized pellets.

The product had a density of 27-29 g/50 ml. and a water absorption capacity value of 75-100% of that of a clay litter. (No Name* product of Sunfresh Ltd. of Toronto, Canada)

EXAMPLE 2

The procedure of example 1 was repeated but with the substitution of 150 kg of dehydrated ground and screened alfalfa for the ground newspaper, and 20 kg of starch instead of 15 kg.

The product had a density of 27-29 g/50 ml and a water absorption capacity of 75-100% of that of the clay litter referred to in Example 1.

EXAMPLE 3

The procedure of example 1 was repeated except using 100 kg ground paper and 50 kg dehydrated, ground and screened alfalfa instead of 150 kg. ground paper, and 20 kg starch instead of 15 kg.

The product had a density of 27 g/50 ml and a water absorption capacity of 75-100% of that of the clay litter referred to in Example 1.

EXAMPLE 4

The procedure of example 1 was repeated using 655 kg sand, 150 kg ground paper, 50 kg dehydrated, ground and screened alfalfa, 100 kg limestone, 30 kg cement, 15 kg starch and 100 g of sodium dioctylsulfosuccinate.

The product had a density of 23-24 g/50 ml. and a water absorption capacity of 90-110% of that of the clay litter referred to in Example 1.

EXAMPLE 5

The procedue of example 1 was repeated using 150 kg paper, 110 kg limestone, 30 kg cement, 715 kg sand, 5 kg guar gum and 100 g of sodium dioctylsulfosuccinate. The guar gum was mixed with the water at 40° C.

The product had a density of 27-29 g/50 ml and a water absorption capacity of 75-100% of that of the clay litter referred to in Example 1.

EXAMPLE 6

A comparison was carried out of the wetting properties of products according to the invention prepared as in examples 1, 2 and 5 with and without surfactant in the formula. The results are given for samples dried immediately after agglomeration and 12 hours after agglomeration. The following results were obtained for 20 g of each absorbent material and 15 mls water.

|  | Wetting Time | |
| --- | --- | --- |
|  | Without surfactant | With surfactant |
| Dried immediately | 5-20 sec. | 0-5 sec. |
| Dried after 12 hours | 3-20 min. | 0-5 sec. |

EXAMPLE 7

The procedure of example 1 was repeated using 100 kg. ground gypsum, 160 kg. ground paper, 120 kg. (ground) peat moss, 30 kg. cement, 573.6 kg. sand, and a mixture of 15 kg. starch, 0.5 kg. guar gum and 300 g. sodium dioctyl-sulfosuccinate in 350 kg. water.

The product had a density of 22.5 g/50 ml. and a water absorption capacity of 95-110% of that of the clay litter referred to in Example 1.

EXAMPLE 8

The procedure of example 1 was repeated using 100 kg ground gypsum, 140 kg. ground paper, 100 kg. peat moss, 30 kg. cement, 613.6 kg. sand and a wet mix of 15 kg. starch, 0.5 kg. guar gum, 300 g. sodium dioctylsulfosuccinate in 350 kg. water.

The product had a density of 25.5 g/50 ml. and a water absorption capacity of 95-110% of that of the clay litter referred to in Example 1.

EXAMPLE 9

50 g. of two commercial samples of alfalfa pellets (Litter Green* distributed by The Clorox Company of Canada Ltd. of Vancouver, B.C. and Ultrasorb* of Calitco Ltd., Dauphin, Manitoba) were saturated with water and both samples disintegrated upon drying producing fines. 50 g of each of the products of examples 1 to 5, and 7 and 8 under similar conditions could be reused over 10 times when each test was terminated.

The embodiments of the invention in which an exclusive property or privilege is claimed are defined as follows:

1. A dried agglomerated biodegradable absorbent material for household and industrial use, made from ingredients comprising
   (a) a solid non-fibrous odour control material, which is basic, neutral or acidic;
   (b) a member of the group consisting of dried alfalfa or other chlorophyll containing grasses, baking soda, finely divided paper, wood flour, sawdust, peat moss, cotton seed hulls and tomato pumice and mixtures thereof, said baking soda not being present with an acidic odour control material, said peat moss, cotton seed hulls and tomato pumice only being present in conjunction with an acidic or neutral odour control material;
   (c) a member of the group consisting of Portland cement and plaster of Paris;
   (d) a binder of the group consisting of starches, gum, glues and mixtures thereof; and
   (e) a density control agent; the ingredients being in amounts selected to provide required density, strength and water absorbent properties to said material.

2. The material of claim 1 wherein said odour control material comprises gypsum.

3. The material of claim 2 also including peat moss.

4. The material of claim 2 wherein the density control agent is said gypsum.

5. The material of claim 1 wherein the density control agent is a member of the group consisting of sand, soil, ground rock, flyash and mixtures thereof.

6. The material of claim 1, wherein the binder consists of a member of the group consisting of starches in an amount of about 1-3% by weight of total composition, gums in an amount of about 0.5-3% by weight of total composition and glues in an amount of 2-10% by weight of total composition.

7. The absorbent material of claim 1, further including a surfactant or wetting agent.

8. The material of claim 1, wherein the density control agent is a member of the group consisting of sand, soil, ground rock, flyash and mixtures thereof in an amount of 50 to 90% by weight of total composition.

9. The absorbent material of claim 1, wherein component (b) is present in an amount of 1 to 30% by weight of total composition.

10. The absorbent material of claim 1 wherein component (a) is present in an amount of 5 to 30% by weight of total product.

11. The composition of claim 1 wherein component (c) is present in an amount of 0.1 to 10% by weight.

12. The absorbent material of claim 1 to be utilized as a cat litter and which has an agglomerate particle size of 1 to 5 millimeters diameter.

13. The absorbent material according to claim 12 wherein the density is of the order of 20 to 30 grams per 50 mls.

14. A dried agglomerated biodegradable absorbent material for househould and industrial use, made from ingredients comprising
   (a) limestone as basic odour control material,
   (b) a member of the group consisting of dried alfalfa or other chlorophyll containing grasses, baking soda, finely divided paper, wood flour, sawdust and mixtures thereof;
   (c) a member of the group consisting of Portland cement and plaster of Paris;
   (d) a binder of the group consisting of starches, gum, glues and mixtures thereof;
   (e) a density control agent; the ingredients being in amounts selected to provide required density, strength and water absorbent properties to said material.

15. The material of claim 14 wherein the density control agent is said limestone.

16. The absorbent material according to claim 3, 14 or 5 wherein a surfactant is present in an amount of 0.01 to 3% by weight of total composition.

17. The absorbent material of claim 3, 14 or 5 wherein a surfactant is present and is of the group consisting of sodium dioctyl sulfosuccinate and polyoxyethylene sorbitan esters.

18. A dried agglomerated biodegradable absorbent material for use as a cat litter comprising sand in an amount of 70% by weight of composition, 5% by weight dried alfalfa and 10% by weight finely divided paper based on total composition, limestone in an amount of 10% by weight of composition, Portland cement in an amount of 3% by weight of composition, starch in an amount of 2% by weight of composition and as surfactant, sodium dioctylsulfosuccinate in an amount of 0.01% by weight of total composition.

19. A dried aggomerated biodegradable absorbent material for use as a cat litter comprising sand in an amount of about 70% by weight of composition, 5% by weight of peat moss, 10% by weight finely divided paper, gypsum in an amount of 10% by weight, Portland cement in an amount of 3% by weight, starch in an amount of 2% by weight and 0.01% by weight of surfactant, all by weight of composition.

* * * * *